United States Patent
Rimer

(10) Patent No.: US 10,588,296 B1
(45) Date of Patent: Mar. 17, 2020

(54) FILTER MEDIA CUP WITH FLOW ENHANCING SLITS

(71) Applicant: Andrew Carlton Rimer, Parrish, FL (US)

(72) Inventor: Andrew Carlton Rimer, Parrish, FL (US)

( * ) Notice: Subject to any disclaimer, the term of this patent is extended or adjusted under 35 U.S.C. 154(b) by 0 days.

(21) Appl. No.: 16/022,227

(22) Filed: Jun. 28, 2018

Related U.S. Application Data

(63) Continuation-in-part of application No. 15/886,877, filed on Feb. 2, 2018.

(51) Int. Cl.
| | |
|---|---|
| *A01K 63/04* | (2006.01) |
| *B01D 35/31* | (2006.01) |
| *C02F 3/10* | (2006.01) |
| *B01D 29/17* | (2006.01) |
| *C02F 101/16* | (2006.01) |

(52) U.S. Cl.
CPC ............ *A01K 63/045* (2013.01); *B01D 35/31* (2013.01); *B01D 29/17* (2013.01); *B01D 2201/302* (2013.01); *C02F 3/104* (2013.01); *C02F 3/106* (2013.01); *C02F 2101/16* (2013.01)

(58) Field of Classification Search
CPC .................. A01K 63/045; B01D 35/31; B01D 2201/302; B01D 29/17; C02F 3/104; C02F 3/106; C02F 2101/16
USPC ..... 210/150, 151, 167.22, 167.25, 448, 473, 210/474, 615, 616, 617, 903; 119/259, 119/260
See application file for complete search history.

(56) References Cited

U.S. PATENT DOCUMENTS

| | | | | | |
|---|---|---|---|---|---|
| 2,773,828 | A | * | 12/1956 | Schiavo | ............... A01K 63/045 210/167.25 |
| 3,717,123 | A | * | 2/1973 | Regnier | .................. A01K 63/02 119/203 |
| 3,771,664 | A | * | 11/1973 | Schrink | ................... B01D 29/23 210/445 |
| 4,895,646 | A | * | 1/1990 | Willinger | ............. A01K 63/045 210/167.25 |
| 2006/0086656 | A1 | * | 4/2006 | Morgan | ................. B01D 29/27 210/448 |

* cited by examiner

*Primary Examiner* — Fred Prince

(74) *Attorney, Agent, or Firm* — Dorothy S. Morse

(57) ABSTRACT

A waterproof, non-toxic, and reusable filter media retaining cup having molded construction, a non-compartmentalized interior space, and a perimeter wall with a preferred slight top-to-bottom taper extending between a radial flange and an opposed bottom end having spaced-apart perforations and a non-perforated center area. The outwardly-extending radial flange depends from the top of the perimeter wall and spaced-apart slits through the perimeter wall's bottom portion extend to the bottom end and are preferably downwardly-widening. The bottom end perforations and wall slits in combination with the bottom end's non-perforated center area provide accelerated aquarium water turnover through contaminant-removing filter media retained in the non-compartmentalized interior space, while avoiding clogging and channeling that would otherwise slow the breakdown and removal of uneaten food particles and marine life bio-waste in the aquarium water, which in increasing concentrations becomes toxic to the marine life in an aquarium tank depending on it for survival.

20 Claims, 5 Drawing Sheets

FILTER MEDIA CUP WITH FLOW ENHANCING SLITS

CROSS-REFERENCES TO RELATED APPLICATIONS

This patent application relates in subject matter to U.S. utility patent application Ser. No. 15/886,877, having the title of FILTER MEDIA CUP, which was filed on Feb. 2, 2018, by the same applicant/inventor herein. As a result of the overlapping subject matter involved, the applicant/inventor herein respectfully requests that domestic priority be granted for his currently filed and now pending U.S. utility patent application herein based upon his earlier-filed, and still co-pending, U.S. utility patent application Ser. No. 15/886,877.

BACKGROUND OF THE INVENTION

Field of the Invention

The invention of the applicant/inventor disclosed herein, and the invention disclosed in his previously filed U.S. utility patent application Ser. No. 15/886,877, both relate to devices and containers used in the filtration and removal of contaminants from aquarium water, particularly to a reusable cup and methods for its use, the cup manufactured to hold numerous types of filter media for achieving effective and efficient removal of a variety of contaminants from aquarium water without filter media channeling or clogging. The present invention cup also has fluid flow enhancing structure (not found in the bottom end and perimeter wall of his invention disclosed in U.S. patent application Ser. No. 15/886,877) that succeeds in achieving a higher volume of aquarium water turnover during contaminant removal activity.

The most preferred embodiment of the present invention has molded construction and is made from non-toxic, waterproof plastic materials, including but not limited to 100% virgin BPA-free polypropylene. It is also open at its top end, has a bottom end with a non-perforated center area, and further has a slightly downwardly-narrowing perimeter wall extending upwardly from the bottom end, which together define a non-compartmentalized interior space. In addition to the non-perforated center area, the bottom end of present invention embodiments also have a plurality of perforations through it that are sufficiently numerous for substantial/abundant distribution across the bottom end between the non-perforated center area and the perimeter wall, and considerations as to the number, size, shape, and positioning of the perforations used being factors contributing to the enhanced flow of aquarium water through filter media placed within its non-compartmentalized interior space. Perforation features, number, and location must also be selected so that they won't compromise bottom end strength and stability during filtration/decontamination activity, or diminish the anticipated/useful life of the present invention. The most preferred embodiment of the present invention further has a radial flange outwardly-extending from the top of its perimeter wall which serves multiple functions, and a plurality of spaced-apart slits in the bottom portion of its perimeter wall that extend downwardly to the bottom end and are a major contributor to enhanced aquarium water flow which allows faster and more efficient/effective contaminant removal without channeling or clogging. The lateral slits of the most preferred embodiment of the present invention also each have a downwardly-widening configuration, which is preferred but not considered critical.

The purpose of the refillable filter media cup of the present invention with its multiple bottom end perforations and multiple lateral perimeter wall slits, is to hold and retain a quantity of contaminant-removing filter media in a fixed position during aquarium water filtration activity (until the filter media becomes spent and is no longer able to efficiently and effectively remove contaminants from aquarium water, and after which its replacement with new filter media is required to continue decontamination activity), while at the same time allowing a high rate of aquarium water flow through the retained filter media, in applications relating to both newly installed and existing filtration systems. The present invention filter media cup is repeatedly reusable and particularly suited for aquarium tanks needing a high fluid turnover rate during contaminant removal from aquarium water to effectively maintain a proper habitat for the safety of marine life present, such as use with an aquarium tank having a newly enlarged marine population that now might require two filter media cups for effective and efficient aquarium decontamination, yet the filtration system currently in use was designed to only accommodate a single filter sock (or other filtration unit). When refilled with fresh filter media and reused, the present invention is a low cost and low maintenance option when compared to known prior art.

Immobilizing a quantity of filter media for aquarium water decontamination, which is typically accomplished less effectively and efficiently than the present invention via other filter media holding devices (such as filter socks), allows sequential amounts of water drawn from an aquarium tank to pass through very small gaps/spaces between individual pieces of the filter media, while concurrent contact of the aquarium water with the filter media itself as it passes through the filter media removes contaminant organics and other particulate/substances that in increasing concentrations would become toxic to the marine population housed in an aquarium tank. After contact with the filter media in a present invention filter media cup, water with less contaminant content leaving the filter media cup (through its bottom perforations and lateral slits) is returned to the aquarium tank while additional aquarium water from another area within the aquarium tank still in need of decontamination is thereafter continuously and sequentially drawn through the filter media cup for as long a time as is needed for various targeted contaminants (such as but not limited to organic matter, ammonia, and nitrites) in the aquarium water to be reduced in concentration to non-toxic levels and/or break down into substances less hazardous to the marine populations present. Typically, decontaminated water is returned to the aquarium tank via a submersible pump, while the water drawn from an aquarium tank most often reaches the filter media cup via gravity feed and/or siphon. However, the means of aquarium water transfer is not critical, and other options and/or combinations are also considered to be within the scope of the present invention.

One important application of the flow-enhancing filter media cup herein is to replace the widely used felt filter socks attached to a plastic ring that suspends the sock downwardly from the top opening of a waterproof/water-collecting support device (or tray), the lower end of which is in fluid communication with the aquarium tank from which the now decontaminated (or less contaminated) water was originally taken, so that the now decontaminated water can be promptly returned to the aquarium tank where it provides the immediate benefit of lowered contaminant concentrations collectively within the aquarium tank. While the decontaminated aquarium water returning from the present invention to the aquarium tank may not be totally devoid of contaminants targeted for removal, use of the word 'decontaminated' in this disclosure is intended to indicate a 'state of less contamination' in the aquarium water occurring after contact with filter media.

Disadvantages of prior art felt filter socks include easy clogging and filter media channeling that reduces the decontamination efficiency of the filter media housed within them, and depending upon the size of the aquarium tank and the amount of aquatic life present, the felt filter socks used may need to be replaced multiple times each week to maintain water quality in the aquarium tank at optimal levels for healthy marine life. While removal and replacement of a felt filter sock in a waterproof/water-collecting support device (or tray) is not time consuming, the cleaning and drying procedure required before a felt filter sock can be returned to service is time consuming, and aquarium operators would need to purchase at least 3-4 felt filter socks for effective and efficient felt filter sock recycling (and depending upon aquarium size and population, perhaps more than four felt filter socks would be required, which are not inexpensive). All of the above-identified prior art disadvantages make alternative use of the present invention herein desirable, and an important and helpful improvement over the prior art. The present invention is a less costly option, and in addition its does not clog, and aquarium water flowing through it does not cause the premature decontamination inefficiency due to channeling in the filter media that often occurs when felt filter socks are used for aquarium water decontamination, resulting in the present invention being a simpler, easier, more effective, and less time consuming choice for managing water aquarium filtration and achieving the routine and frequent replacement of filtration media and equipment needed for thorough and effective reduction of a variety of contaminants routinely present in aquarium water as a consequence of its use to support aquatic life. In certain cross-sectional configurations, a slight top-to-bottom taper in the side wall of the present invention filter media cup is preferred to facilitate manufacturing, and may also be helpful for compact/efficient shipping and storage of stacked filter media cups. Furthermore, a small, stepped, outwardly-extending, and grip-enhancing rim or flange at the top end of the present invention filter media cup is preferred to facilitate handling and release of individual cups from a support device or stacked array.

Description of the Related Art

In order to successfully maintain healthy marine life in an aquarium, it is recommended that fresh water and brackish/salt water aquarium owners alike use some type of filtering means to clean its water and achieve a proper balance of food, potentially toxic waste (including the constantly-generated bio waste of resident marine life), and other substances released into the aquarium water, or the aquarium water will eventually become toxic to the marine life depending on it for survival, and the marine life will die. Also, while partial replacement of aquarium water on a regular schedule can be an effective means for reducing the build-up of nitrate in aquarium water, frequent and substantial replacement of aquarium water with new water generally for contaminant reduction purposes is not recommended, as several weeks are typically needed to build effective population levels of nitrobacter and nitrosomonas bacteria in aquarium water to break down the ammonia from marine life bio waste into less toxic substances (ammonia into nitrite and nitrite into nitrate, and although nitrate is the least toxic of the three substances to resident marine life, in high concentrations it still remains a threat to marine life health and viability).

Many options are available for filtering aquarium water, and include, mechanical filters, chemical filtration, and biological filters. The present invention can be effectively used with different types of filter media (with or without optional retention inserts) to accomplish all three of these types of filtration. The present invention filter media cup was initially contemplated mainly as a substitute for felt filter socks attached to a plastic ring that are used in a filter tray, which clog easily and must be rinsed thoroughly and dried after each use, making them a high maintenance option even if they are cleaned in a washing machine, instead of by hand. In contrast, the refillable filter media cup of the present invention (employed particularly when high fluid flow rates are required to achieve appropriate decontamination for larger aquarium tanks having large and/or diverse marine populations) has lateral slits in the bottom portion of its perimeter wall between an open top end and a perforated bottom end to achieve the needed higher rate of aquarium water cycling for effective contaminant filtration without the disadvantages of filter media channeling and clogging, and then when the filter media is spent and needs to be replaced, the present invention filter media cup is simply emptied of spent filter media into a waste container and then promptly refilled and placed back into use with the same type (or a different type) of filter media according to the current decontamination need, and without any intermediate rinsing or drying steps required.

The present invention filter media cup is suitable for use with brackish/salt water and fresh water aquariums, and it is compatible/suitable for use with activated carbon when removal of dissolved organic matter from the aquarium water is needed, granular ferric oxide (GFO) when removal of phosphate from the aquarium water is needed, and biological filter material (beneficial denitrifying bacteria) when assistance in removing ammonia and nitrites from the aquarium water is needed. As mentioned above, the denitrifying bacteria convert ammonia to nitrites, and then nitrites into nitrates, which can be consumed by aquarium plants or alternatively diluted to levels tolerable to the marine population in the aquarium by partial aquarium water replacement on a regular schedule so that a continual build-up of nitrate does not detrimentally change the pH of the aquarium water and adversely affect the marine population relying on balanced/non-toxic aquarium water for its survival. In addition, according to the fineness/coarseness of the filter media used with the present invention filter media cup, on an "as needed" basis and in consideration of the various flow rates preferred for use with different filter media to achieve the most effective removal of a variety of contaminants from aquarium water, retention inserts may be optionally used in association with filter media housed in an enhanced-flow present invention filter media cup, such as but not limited to, filter floss, one or more sponges, or a filter sock employed within the filter media cup's non-compartmentalized interior space to prevent release of filter media from the cup and/or premature break-up of filter media granules that after some use could lead to release of filter media from the cup and its unintended travel into the aquarium tank. For example, a medium flow rate is generally used with granular ferric oxide (GFO) and to reduce channeling, thus the GFO can be placed inside a filter sock (and the filter sock then placed within the present invention filter media cup) which allows a more vigorous flow of aquarium water through the GFO with more GFO/water contact and less GFO breakdown, which extends the GFO's useful/effective filtration life. Furthermore, a high aquarium water flow rate is often used through biological filter media to achieve maximum effectiveness in the conversion of ammonia to nitrite, and the successive conversion of nitrite into nitrate, which can then be removed through consumption by aquarium plants or dilution via periodic replacement of a portion of the aquarium water with new water having a low nitrate concentration. The present invention herein provides the enhanced fluid flow needed for efficient and effective biological filtration.

In addition and advantageously, when the refillable and flow-enhanced present invention filter media cup is placed in the same position as a felt filter sock, a low maintenance option is realized as compared to use of felt filter socks, as the present invention filter media cup is readily accessible to the aquarium owner and after the disposable filter media used in it becomes spent, the spent filter media can be quickly discarded, and without any subsequent rinsing or drying steps, the present invention filter media cup can be quickly refilled with fresh disposable filter media (same type previously used, or new type to be employed for removal of different decontaminants) and then promptly slid onto a filter tray (or placed in a filter media reactor or other support device) to provide fixed positioning for the quantities of filter media successively employed, and fast/easy continuation of effective aquarium water filtration as long as needed for removal of targeted contaminants. Enhanced convenience, low cost, no tendency for clogging or channeling in the filter media used, and reduced maintenance labor are benefits provided to users when they employ the flow-enhancing present invention filter media cup for fresh water and brackish/salt water aquarium water filtration, a combination of benefits not presently known with use of any prior art aquarium water filtration-assisting device.

SUMMARY OF THE INVENTION

The primary objective of this invention is to provide a filter media cup for aquariums that reduces the labor cost associated with filter media exchange, and also reduces the overall filtering cost while maintaining a high rate of aquarium water turnover during aquarium water decontamination activity. A further objective of this invention is to provide a filter media cup for aquariums that is renewed for continued use by simple disposal of spent filter media therein directly into a waste container, and then placement of fresh/non-spent disposable filter media into the same present invention filter media cup without any need for rinsing or drying steps. It is also an objective of this invention to provide a filter media cup for aquariums with a sufficient number of holes through its bottom end, in combination with a sufficient number of slits through the bottom portion of its perimeter wall, to facilitate a high rate of aquarium water turnover diverted through the cup for water decontamination purposes. In addition, it is an objective of this invention to provide a low-cost filter media cup made via injection molding from waterproof, non-toxic plastic material, preferably 100% virgin BPA-free polypropylene, although other substitute materials can also be used, such as but not limited to acrylic.

The present invention is preferably about four inches in diameter and approximately seven inches in height, but is not limited thereto, and other height and diameter dimensions are also considered to be within the scope of the present invention if needed currently, or in the future, to fit available C-shaped felt filter supports (or trays), filter media reactors or other supports made for use with filter socks. Also, although the present invention filter media cup shown in the accompanying illustrations has a circular cross-section, other cross-sectional configurations are also contemplated, including but not limited to that of a rectangle, hexagon, or octagon, with an understanding that maximum aquarium water flow and contact with filter media for efficient removal of contaminants is always a priority when considering structural changes to any embodiment of the present invention filter media cup. The fluid flow-enhancing present invention allows for prompt and easy exchange of disposable filter material without any need for rinsing or drying the present invention cup during such exchange. Also, although not limited thereto, a small and outwardly-extending radial rim/flange at the top of the present invention cup strengthens its perimeter wall, and provides a grip-enhancing surface during insertion and removal of the present invention cup into and from a supporting filter device/tray. These and other advantages/benefits provided by the present invention and currently disclosed herein are not known in the prior art. No system or method is currently known to have all of the structural features and advantages of the present invention herein, or provide the motivation to teach them.

COMPONENT LIST

1—most preferred embodiment of the present invention filter media cup

Figure 8:
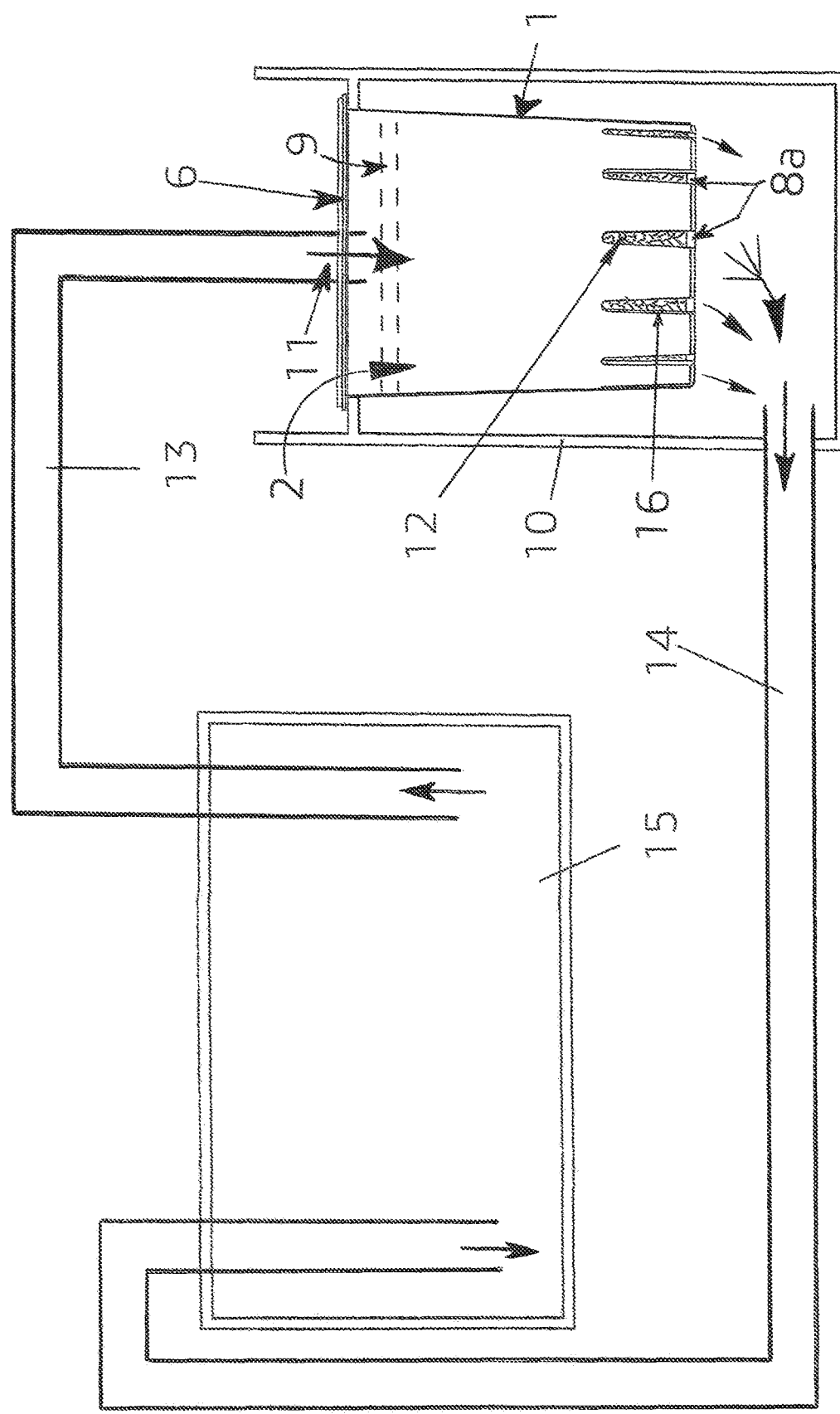
FIG. 8 is side view of the present invention filter media cup containing filter media and supported by a waterproof/water-collecting device or tray that is in fluid communication via tubing with the aquarium tank from which the now decontaminated (or less contaminated) aquarium water exiting the filter media cup (and eventually returned to the aquarium tank) was originally withdrawn, with use of the present invention filter media cup reducing channeling/clogging of the filter media while aquarium water passing through it is filtered, promoting faster, more efficient, and more effective cleaning/decontamination of the aquarium water for the benefit of marine life residing in the connected aquarium tank and depending on non-toxic aquarium water for its survival.

2—non-compartmentalized interior space of Filter Media Cup 1 [see FIG. 8]

3—perimeter wall of Filter Media Cup 1 [preferably with a slight/small downward taper]

4—top portion of Perimeter Wall 3

5—bottom end of Filter Media Cup 1

6—small/radial rim or flange [outwardly extends from the top of Perimeter Wall 3]

7—stepped top surface configuration of rim/flange 6 [provides grip-enhancing advantage for handling Filter Media Cup 1 during exchange of Filter Media 12]

8*a*—small perforations through Bottom End 5 of Filter Media Cup 1

8*b*—large perforations through Bottom End 5 of Filter Media Cup 1

9—retaining insert [FIG. 8 shows one example optionally usable with Filter Media Cup 1 to secure/retain some types of Filter Media 12 in a stationary position for more effective and efficient Aquarium Water 11 filtration without channeling, clogging, or premature breakdown of the Filter Media 12]

10—support device/tray usable with Filter Media Cup 1 [FIG. 8 shows one example/option]

11—aquarium water

12—filter media

13—inlet port/tubing [transfers high contaminant Aquarium Water 11 from Aquarium Tank 15 to Filter Media Cup 1]

14—outlet port/tubing [transfers decontaminated or less contaminated Aquarium Water 11 after exit from Filter Media Cup 1 back to Aquarium Tank 15]

15—aquarium tank

16—slits in the Bottom Portion 18 of Perimeter Wall 3

17—non-perforated center area in Bottom End 5 [causes radial flow of Aquarium Water 12 reaching it laterally toward Perforations 8*a*/8*b* and Slits 16 for return to Aquarium Tank 15]

18—bottom portion of Perimeter Wall 3

DETAILED DESCRIPTION OF THE INVENTION

FIGS. 1-7 show structural details and considerations in the most preferred embodiment of the present invention filter media cup 1, while FIG. 8 shows filter media cup 1 during one example of its use. FIGS. 1-7 show filter media cup 1 having a height dimension greater than its width dimension, a non-compartmentalized interior space 2 (see it in FIGS. 1, 2, and 8), and a preferred slight/small downward narrowing of its perimeter wall 3 between its outwardly-extending radial flange 6 and the opposed bottom end 5 (see FIGS. 1-8). The downward narrowing of perimeter wall 3 assists in the manufacturing of molded filter media cup 1 and also beneficially facilitates its compact shipping or storage in stacked array. The radial and outwardly-extending small flange 6 surrounding the top of perimeter wall 3, preferably having a stepped configuration 7, provides a grip-enhancing surface for easy movement/handling of filter media cup 1, and its mounting onto a filtration support device or tray 10 (see FIG. 8).

Figure 1:
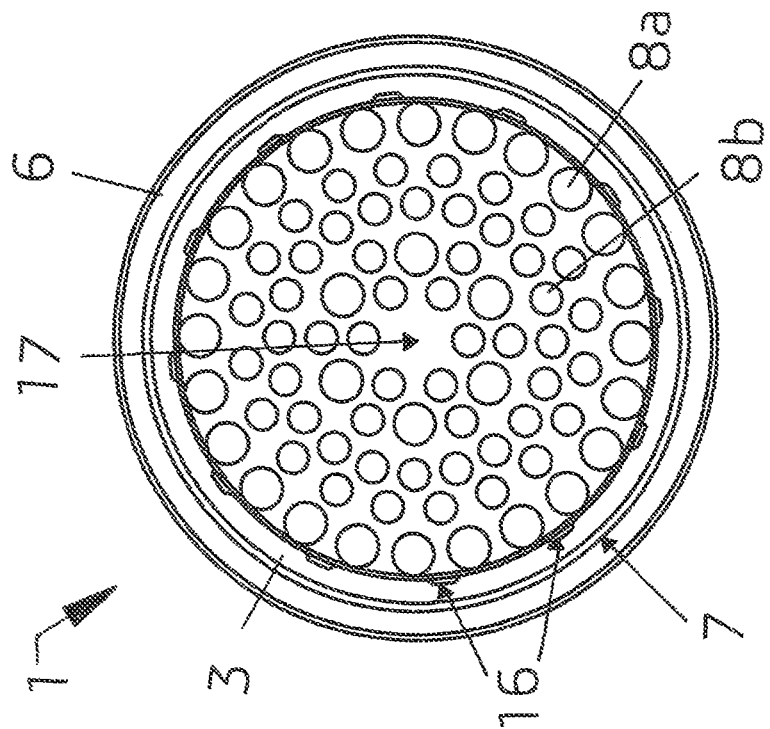
FIG. 1 is a bottom view of the most preferred embodiment of the present invention filter media cup showing its bottom end having a non-perforated center area and multiple perforations of differing size distributed substantially throughout the remainder of the bottom end, a perimeter wall extending upwardly away from the bottom end, a plurality of lateral slits in the bottom portion of the perimeter wall, each preferably vertically-extending and widest at its connection with the bottom end, and a radial flange outwardly-extending from the top of the perimeter wall.
Figure 2:
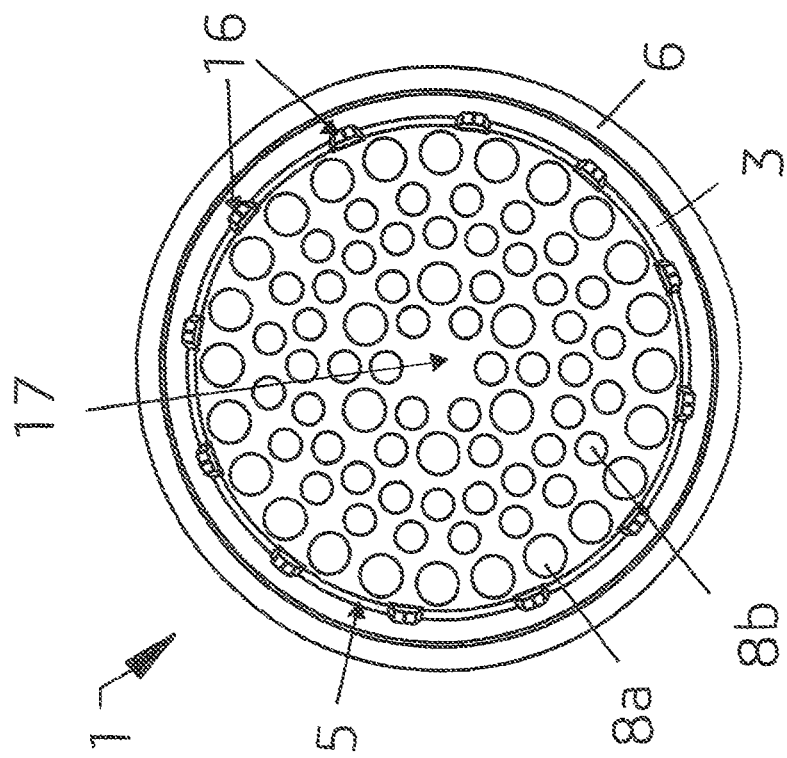
FIG. 2 is a top view of the present invention filter media cup in FIG. 1, and shows the non-perforated center area in its bottom end and the many bottom perforations also through the bottom end that in combination with lateral slits in the bottom portion of its perimeter wall help to create enhanced fluid flow through the filter media cup without causing channeling or clogging in the filter media held therein during aquarium water decontamination use, with FIG. 2 further showing the lateral slits in the bottom portion of the perimeter wall with each slit extending upwardly from the filter media cup's bottom end, as well as a radial flange extending outwardly around the top of the perimeter wall and the top surface of the flange having a grip-enhancing stepped configuration.
Figure 4:
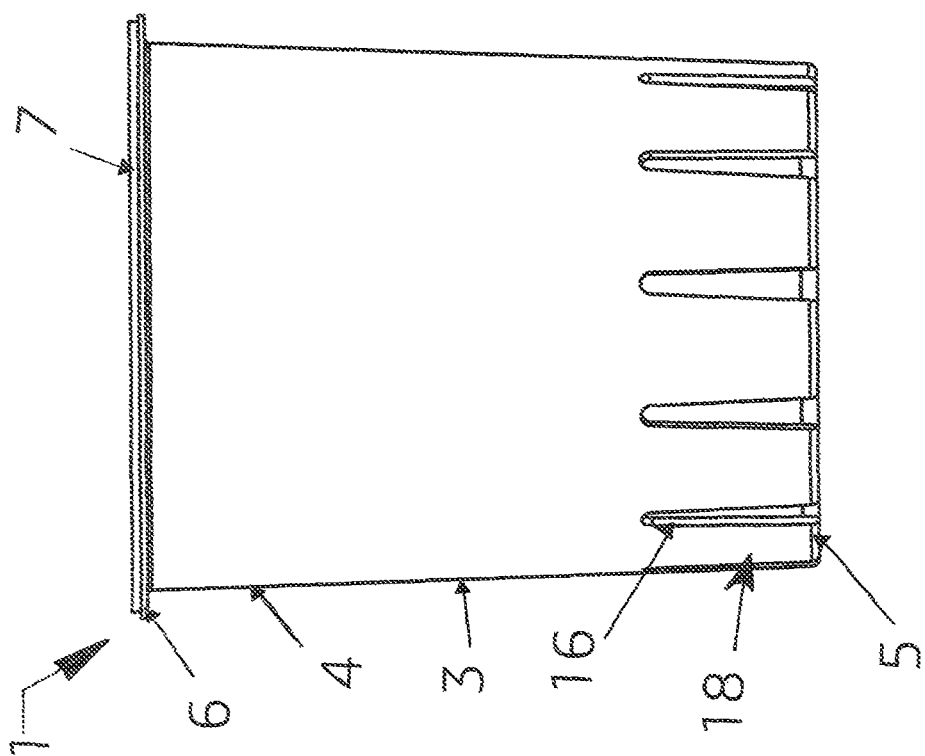
FIG. 4 is a back view of the present invention filter media cup in FIGS. 1-3, with the configuration shown substantially similar to that in FIG. 3.
Figure 3:
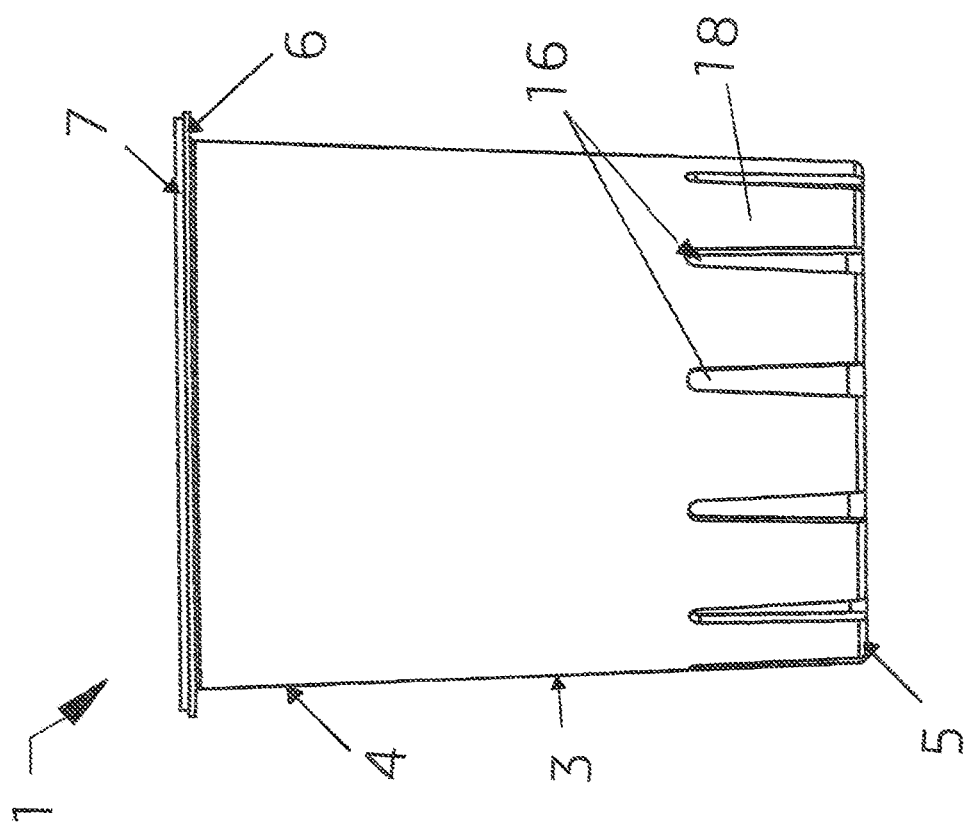
FIG. 3 is a front view of the present invention filter media cup in FIGS. 1 and 2, and shows the perimeter wall positioned between a small outwardly-extending radial flange and the opposing bottom end, and the perimeter wall also having multiple flow-enhancing slits through its bottom portion, each slit having an downwardly-widening configuration and contact with the bottom end of the filter media cup.
Figure 5:
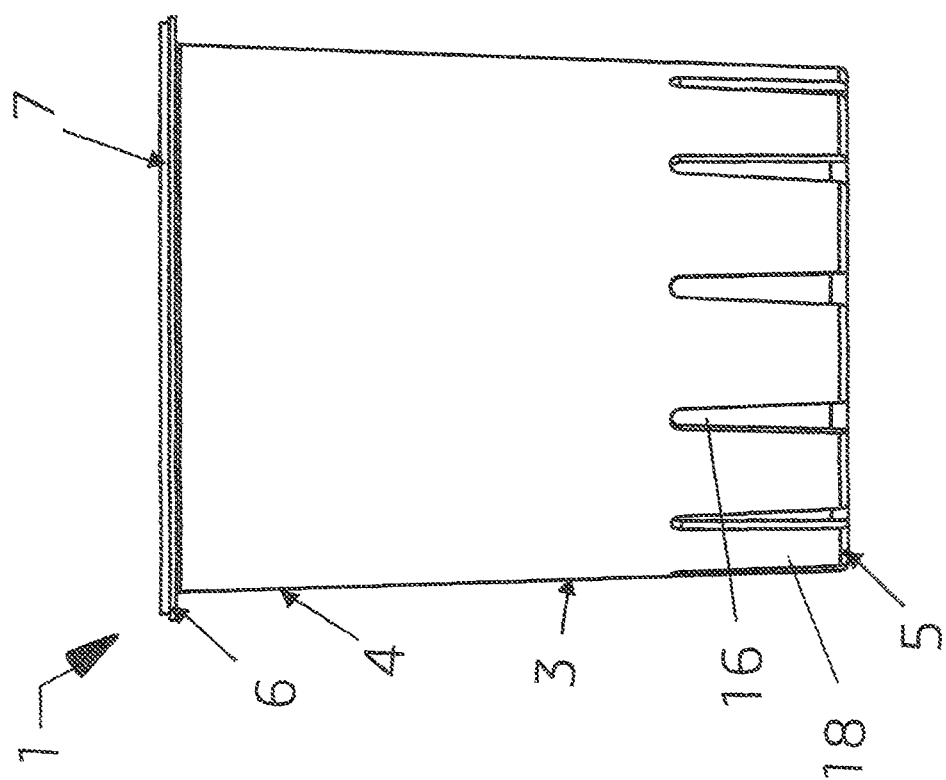
FIG. 5 is a right side view of the present invention filter media cup in FIGS. 1-4, with the configuration shown substantially similar to that in FIGS. 3 and 4.
Figure 6:
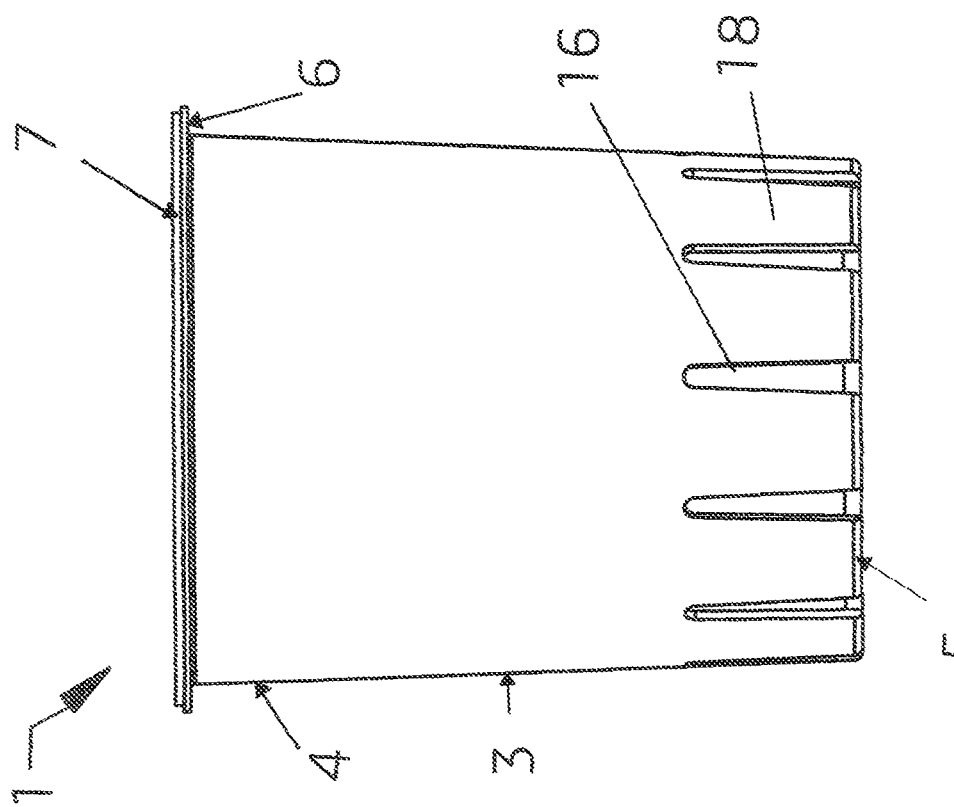
FIG. 6 is a left side view of the present invention filter media cup in FIGS. 1-5, with the configuration shown substantially similar to that in FIGS. 3-5.
Figure 7:
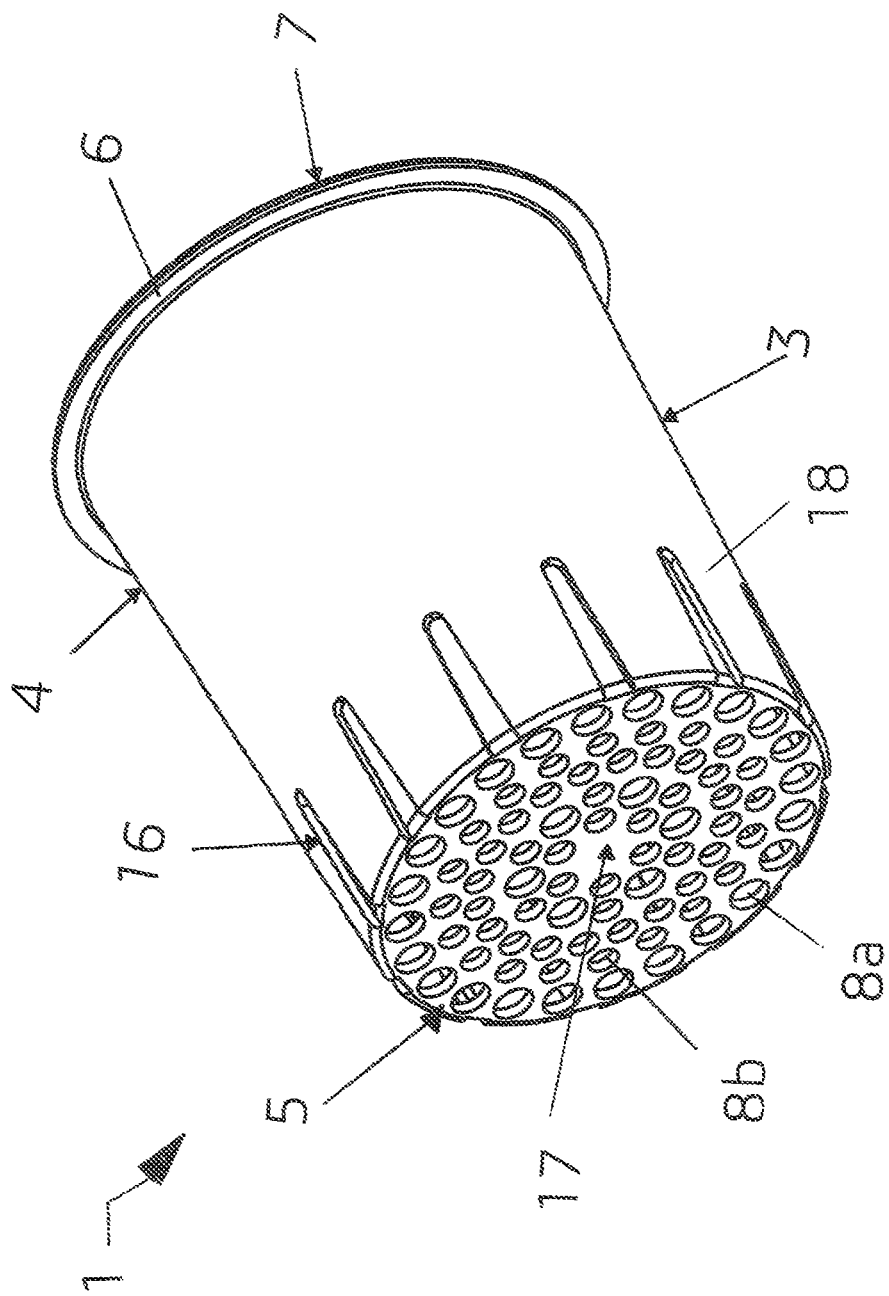
FIG. 7 is a perspective view from the bottom of the present invention filter media cup in FIGS. 1-6, and shows its slightly downwardly-narrowing perimeter wall construction, its outwardly-extending and grip-enhancing stepped top radial flange, its perforated bottom end having a non-perforated center area, and its flow-enhancing slits in the bottom portion of the perimeter wall extending to and engaging the bottom end.

The most preferred height dimension of the enhanced flow filter media cup 1 is approximately seven inches, and the most preferred outside diameter measurement at its top end (including its radial flange 6) is approximately four inches, both dimensions accommodating currently available and widely-used support devices/trays 10 for felt filter socks attached to a plastic ring. However, it is not contemplated for present invention filter media cup 1 dimensions to be limited only to those dimensions. In addition, while FIGS. 1, 2, and 7 show one example of the preferred size, number, configuration, and positioning of perforations or holes (8*a*, 8*b*, and/or other) that is possible in the bottom end 5 of present invention filter media cup 1, it is also contemplated for other perforation arrangements to exist through bottom end 5 as a part of the present invention herein, in place of or in addition to the perforations 8*a* and 8*b* shown in the illustrations accompanying this disclosure. Limitations on the perforation arrangement used as a part of the present invention include successful containment of filter media 12 particles within filter media cup 1, while concurrently providing enhanced fluid flow of aquarium water 11 in and around filter media 12 particles within the filter media cup 1 for maximum contact of aquarium water 11 with filter media 12 for prompt/successful removal of uneaten food particles and marine life bio waste from aquarium water 11 and/or its break down into components less toxic to resident marine life. Should the filter media 12 selected for use in filter media cup be too fine for the size of holes 8*a* and 8*b* present in perforated bottom end 5, or the slits 16 in its perimeter wall 3, a retaining insert 9 (such as floss, at least one sponge, or a media sock) may be optionally used to contain the fine filter media 12 particles within the present invention filter media cup 1 for effective and long duration filtration use. While FIG. 8 shows the present invention filter media cup 1 used in a C-shaped holder/tray 10 for a felt filter sock, an adapter ring (not shown) configured for engagement with (and support of) flange 6 may be used with filter media cup 1, thus allowing use of the present invention with other current (and/or newly developed) aquarium water filtration systems/apparatus/devices.

The primary objective of the present invention filter media cup 1 is to provide a filter device for both fresh water and brackish/salt water aquarium tanks 15 that reduces the labor cost of filter media 12 exchange, and also reduces water filtering costs in multiple other ways. At the end of its useful life, spent filter media 12 is simply discarded into a waste container (not shown), and filter media cup 1 is renewed for continued (or different) use by a simple step of adding an appropriate amount of new/fresh filter media 12 (such as that shown in FIG. 8) to filter media cup 1 without any rinsing or drying steps. Furthermore, when filter media cup 1 is manufactured from colored opaque material, which may be a preference for some users, blemishes/scratches in perimeter wall 3 that may occur as a result of changing out filter media 12 may be concealed from view once filter media cup 1 is replaced into its position of use within an aquarium tank 15 for continued filtration/decontamination activity. In addition, manufacture of filter media cup 1 in the most preferred embodiment off the present invention is contemplated from waterproof, non-toxic, molded plastic material, preferably 100% virgin BPA-free polypropylene, so that its use does not adversely affect the marine life depending upon non-toxic aquarium water 11 for its survival. However, use of plastic material is not considered critical, and acrylic or other waterproof and non-toxic material that will fulfill the same functions and objectives can also be used in preferred present invention embodiments.

As previously mentioned, the height and diameter dimensions of various embodiments of present invention filter media cup 1 may differ, but the height dimension of filter media cup 1 is expected to always be greater than its diameter dimension. In addition, although the most preferred embodiment of the present invention is shown with a circular cross-section in FIGS. 1-2 and 8, wherein a generally cylindrical appearance is achieved, other cross-sectional configurations for filter media cup 1 are also contemplated and considered within the scope of the present invention, even though not specifically disclosed in the accompanying illustrations. Furthermore, the small rim or flange 6 around the top of the present invention's perimeter wall 3 strengthens it while providing a grip-enhancing surface for handling the present invention during spent filter media 12 replacement, however its appearance and configuration is also not considered as limited to that shown in FIGS. 1-8. For example, stepped configuration 7 may comprise multiple raised steps or have an irregular width dimension providing gripping advantage. In addition, FIGS. 1, 2 and 7 show a row of small perforations 8b immediately adjacent to the non-perforated center area 17 in bottom end 5, and a row of large perforations 8a around the outer perimeter of bottom end 5 closest to the slits 16 in perimeter wall 3. While such configuration is preferred, it is not considered critical, and other arrangements of perforations (8a, 8b, and other) could also provide equally enhanced fluid flow advantage. The structure, advantages, and benefits provided by the present invention disclosed herein, in combination with its slits 16, are not yet known or anticipated by prior art.

As shown in FIGS. 3-8, one can see that repeatedly reusable filter media cup 1 in the most preferred embodiment of the present invention has a one-piece construction that is easily installed by a user (not shown) lowering it by hand and sliding it into place onto the type of aquarium filter support tray 10 typically used for supporting felt filter socks, wherein the filter support tray 10 becomes located at the output end of the filter pipe 13 (also referred to elsewhere herein as inlet port/tubing 13) and is used to draw contaminated water from an associated aquarium tank 15 and deliver it into the non-compartmentalized interior space 2 of filter media cup 1. Filter media 12 exchange in filter media cup 1 is preferred daily for large aquarium tanks 15, particularly when a large marine life population (not shown) is present. Furthermore, although not shown in FIG. 8, in larger or custom aquarium tanks 15, multiple present invention filter media cups 1 could be used in series, or filter media cups 1 having custom length and diameter dimensions could be manufactured/employed according to need.

Prior to first use of a newly manufactured present invention filter media cup 1, it is recommended that it be wiped with white vinegar to clean away any residual material left on cup 1 from the injection molding process. Thereafter, filter media 12 is typically added directly to the filter media cup 1 (but a protective sock, sponge, or other retaining insert 9 may also be associated with cup 1 where helpful to achieve more effective filtration, such as to help retain filter media 12 within filter media cup 1 when filter media 12 has a small particle size or had an increased likelihood of channeling, clogging, and/or premature breakdown before replacement would otherwise be required). When it is spent and replacement with new filter media 12 is needed (or replacement with a filter media 12 characterized for removal of a different contaminant), spent filter media 12 is simply discarded, and new/replacement filter media 12 added to filter media cup 1. No rinsing of the new filter media 12 or filter media cup 1 is required, and no drying step is involved, saving significant labor over the time-consuming washing/drying procedure required to place felt filter socks (not shown) back in service.

FIG. 8 further shows the present invention filter media cup 1 supported from a top portion of a waterproof/water-collecting tray 10, wherein channeling of aquarium water 11 through limited portions of the available filter media 12 is substantially reduced as a result of the enhanced fluid flow that use of filter media cup 1 promotes and achieves, resulting in more effective cleaning of the aquarium water 11 moving through filter media 12 for the benefit of marine animals and plants (not shown) residing in aquarium tank 15. The non-perforated center area 17 in bottom end 5 contributes to the efficient and effective cleaning of aquarium water 11 by causing multi-directional radial flow of aquarium water 11 reaching it laterally toward perforations 8a/8b and slits 16, boosting the rate of aquarium water 11 movement/flow near bottom end 5, and its turnover rate through filter media cup 1 during contamination removal activity. FIG. 8 also shows inlet port/tubing 13 directing contaminated aquarium water 11 downward into the supported filter media cup 1, where aquarium water 11 disperses downwardly through small gaps and spaces between the individual particles of filter media 12 while concurrently making contact with the particles of filter media 12 for removal of aquarium water 11 contaminants (not shown). When aquarium water 11 exits filter media cup 1 through perforations (8a, 8b, or other) as well as through slits 16, and reaches the bottom of waterproof/water-collecting device/tray 10, it contains less contaminants and exits device/tray 10 through outlet port/tubing 14 (typically connected to a submersible pump, not shown) for return under pressure back into aquarium tank 15. When spent filter media 12 in filter media cup 1 no longer effectively achieves decontamination of the aquarium water 11, or when another/different contaminant must be selectively removed from the aquarium water 11 and requires the use of another type of filter media 12, after old filter media 12 is removed from filter media cup 1 and discarded, replacement filter media 12 can promptly continue decontamination of the aquarium water 11 once filter media cup 1 is returned to its desired positioning relative to waterproof/water-collecting tray 10.

While the written description of the invention herein is intended to enable one of ordinary skill to make and use its best mode, it should also be appreciated that the invention disclosure only provides examples of specific embodiments and methods, and many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

I claim:

1. A filter media cup used with an aquarium tank containing aquarium water intended for support of aquatic life, a quantity of filter media that removes contaminants from aquarium water, and a water-collecting support device in fluid communication with the aquarium tank, said filter media cup comprising:
   a height dimension and a width dimension, said height dimension greater than said width dimension;
   an outwardly-extending radial flange;
   a bottom end with a non-perforated center area in an opposed position from said radial flange;
   a perimeter wall extending between said radial flange and said bottom end, said bottom end and said perimeter wall together defining a non-compartmentalized interior space, said perimeter wall having a bottom portion adjacent to said bottom end;
   a plurality of perforations through said bottom end between said non-perforated center area and said perimeter wall; and
   a plurality of slits through said bottom portion of said perimeter wall, each of said slits extending to said bottom end, wherein when said radial flange becomes supported by the water-collecting support device in fluid communication with the aquarium tank, and such fluid communication causes removal of aquarium water from the aquarium tank, flow of the aquarium water through said non-compartmentalized interior space, exit of the aquarium water from said non-compartmentalized interior space via said perforations and said slits, and return of the aquarium water to the aquarium tank, and also when a quantity of filter media appropriate for removal of contaminants in the aquarium water that are potentially toxic and life-threatening to marine life residing in the aquarium tank is placed into said non-compartmentalized interior space, fixed positioning of the filter media in said non-compartmentalized interior space then exposes the filter media to contact with the aquarium water moving with a rate of turnover through said non-compartmentalized interior space and causes removal of the potentially toxic and life-threatening contaminants from the moving aquarium water without channeling or clogging of the filter media.

2. The filter media cup of claim 1 further comprising said radial flange, said perimeter wall, and said bottom end made as a one-piece reusable unit from molded waterproof, and non-toxic plastic material.

3. The filter media cup of claim 2 wherein said plastic material is 100% virgin BHA-free polypropylene.

4. The filter media cup of claim 2 made by injection molding.

5. The filter media cup of claim 1 made from acrylic material.

6. The filter media cup of claim 1 further comprising at least one filter media retention insert in said non-compartmentalized interior space that is selected from a group consisting of sponges, floss material, and filter media socks.

7. The filter media cup of claim 1 wherein said perimeter wall further comprises a top-to-bottom narrowing taper.

8. The filter media cup of claim 1 wherein said perforations in said bottom end have more than one size dimension.

9. The filter media cup of claim 1 wherein said perforations in said bottom end have a circular configuration.

10. The filter media cup of claim 1 wherein said radial flange further comprises a configuration and positioning that strengthens said perimeter wall.

11. The filter media cup of claim 1 wherein said slits are selected from a group consisting of twelve slits having uniform size and shape, slits having the same length dimension, slits having the same shape, slits having the same width dimension, and slits having a downwardly widening configuration.

12. The filter media cup of claim 1 wherein said radial flange further comprises a grip-enhancing stepped configuration.

13. A reusable filter media cup used with an aquarium tank containing aquarium water intended for support of aquatic life, a quantity of filter media that removes contaminants from aquarium water, and a water-collecting support device in fluid communication with the aquarium tank, said filter media cup comprising:
   a height dimension and a width dimension, said height dimension greater than said width dimension;
   an outwardly-extending radial flange;
   a bottom end with a non-perforated center area in an opposed position from said radial flange;
   a perimeter wall extending between said radial flange and said bottom end, said bottom end and said perimeter wall together defining a non-compartmentalized interior space, said perimeter wall having a bottom portion adjacent to said bottom end and a top-to-bottom narrowing taper;
   a plurality of perforations through said bottom end between said non-perforated center area and said perimeter wall;
   a plurality of slits through said bottom portion of said perimeter wall, each of said slits extending to said bottom end, none of said slits having interconnection providing direct fluid communication with any of said perforations in said bottom end; and
   said radial flange, said bottom end, and said perimeter wall made as a one-piece non-disposable unit from molded, waterproof, and non-toxic material, wherein when said radial flange becomes supported by the water-collecting support device in fluid communication with the aquarium tank, such that the fluid communication causes removal of aquarium water from the aquarium tank, flow of the aquarium water through said non-compartmentalized interior space, exit of the aquarium water from said non-compartmentalized interior space via said perforations and said slits, and return of the aquarium water to the aquarium tank, and also wherein when a quantity of filter media appropriate for removal of contaminants in the aquarium water that are potentially toxic and life-threatening to marine life residing in the aquarium tank is placed into said non-compartmentalized interior space, fixed positioning of the filter media in said non-compartmentalized interior space then exposes the filter media to contact with the aquarium water moving at a rate of flow through said non-compartmentalized interior space and causes removal of potentially toxic and life-threatening contaminants from the aquarium water without channeling or clogging of the filter media.

14. The filter media cup of claim 13 wherein said perforations further comprise at least one size of larger perforations and at least one size of smaller perforations, said larger perforations and said smaller perforations arranged to enhance fluid flow throughout said bottom end.

15. The filter media cup of claim 13 wherein said radial flange is selected from a group consisting of radial flanges strengthening said perimeter wall and radial flanges comprising a grip-enhancing configuration.

16. A method of using the filter media cup of claim 1, said method comprising the steps of:

providing said filter media cup of claim 1, an aquarium tank containing aquarium water, a quantity of filter media characterized to remove contaminants from the aquarium water, a water-collecting support device in fluid communication with the aquarium water in the aquarium tank, allowing removal of the aquarium water from the aquarium tank and subsequent return of the removed aquarium water to the aquarium tank;

placing said filter media cup in an upright orientation allowing aquarium water removed from the aquarium tank to be received into said non-compartmentalized interior space;

placing at least a portion of the provided filter media into said non-compartmentalized interior space;

engaging said radial flange of said filter media cup with the provided water-collecting support device to position the provided filter media housed within said non-compartmentalized interior space into the path of aquarium water removed from the aquarium tank so that the removed aquarium water enters said non-compartmentalized interior space and experiences contaminant-removing contact with the provided filter media before returning to the aquarium tank; and commencing flow of aquarium water from the aquarium tank so as to continually draw successive amounts of the aquarium water into said filter media cup for contaminant removing contact with the filter media before the aquarium water exits said filter media cup through said perforations and slits and returns to the aquarium tank.

17. The method of claim 16 further comprising the steps of:

providing a replacement quantity of unspent filter media characterized to remove contaminants from aquarium water;

removing from said filter media cup said at least a portion of the provided quantity of filter media once spent and unable to efficiently remove contaminants from aquarium water; and directly adding said replacement quantity of unspent filter media to said filter media cup without rinsing and drying the unspent filter media and said filter media cup, said steps of providing a replacement quantity of unspent filter media, removing, and directly adding said replacement quantity of unspent filter media occurring after said step of commencing flow of aquarium water in claim 16.

18. The method of claim 16 wherein said quantity of filter media is selected from a group consisting of filter floss, activated carbon, granular ferric oxide, and biological filter material containing beneficial denitrifying bacteria characterized to convert ammonia into nitrites, and then nitrites into nitrates.

19. The method of claim 16 wherein said radial flange has a grip-enhancing surface facilitating engagement and disengagement of said filter media cup from the provided water-collecting support device.

20. The method of claim 16 further comprising the step of providing at least one filter media retention insert selected from a group consisting of sponges, floss material, and filter media socks, and the step of placing said at least one filter media retention insert into said non-compartmentalized interior space.

* * * * *